H. S. WILLIAMS.
NON-SKID DEVICE.
APPLICATION FILED DEC. 5, 1919.

1,379,151. Patented May 24, 1921.

INVENTOR.
HARRY S. WILLIAMS
BY A. B. Bowman
ATTORNEY

UNITED STATES PATENT OFFICE.

HARRY S. WILLIAMS, OF LA MESA, CALIFORNIA, ASSIGNOR OF ONE-HALF TO OTTO A. KELLER, OF SAN DIEGO, CALIFORNIA, AND ONE-FOURTH TO ELGIN O. KOTCHMANN, OF MASON, TEXAS.

NON-SKID DEVICE.

1,379,151.        Specification of Letters Patent.        Patented May 24, 1921.

Application filed December 5, 1919. Serial No. 342,771.

*To all whom it may concern:*

Be it known that I, HARRY S. WILLIAMS, a citizen of the United States, residing at La Mesa, in the county of San Diego and State of California, have invented certain new and useful Non-Skid Devices, of which the following is a specification.

My invention relates to a device to be used in connection with vehicle wheels to prevent the tires from skidding and for providing traction for the wheels when it is muddy and slippery and the objects of my invention are: First, to provide a device of this class which is positioned on the wheel when not in use. Second, to provide a device of this class, a portion of which is connected to the wheel at all times and may be readily applied when desired for use. Third, to provide a device of this class in which a portion only may be used if desired, to get out of a muddy or soft place. Fourth, to provide a device of this class, which is so constructed that the parts will not rattle or make a noise when not in use. Fifth, to provide a device of this class which is always in a position and ready to be applied when required. Sixth, to provide a device of this class which is very simple and economical of construction, durable, easy to apply and which will not readily deteriorate or get out of order.

Figure 1:
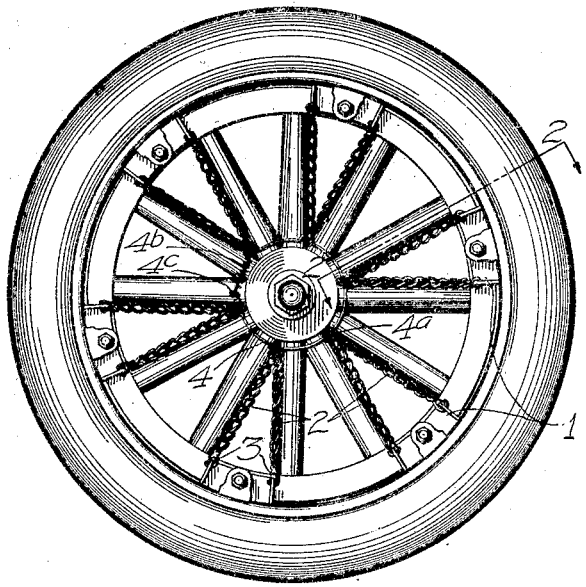
Figure 2:
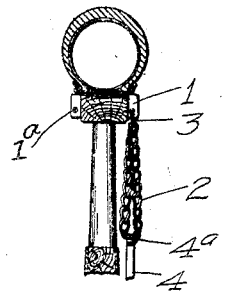
Figure 3:
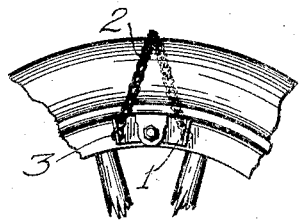
Figure 4:
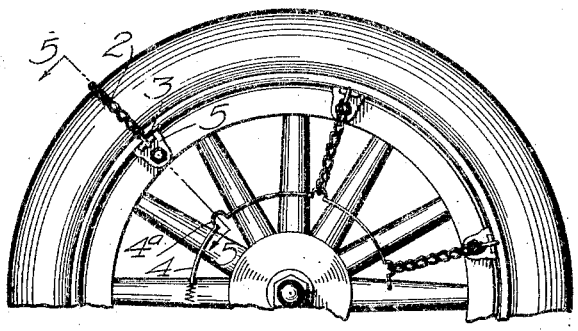
Figure 5:
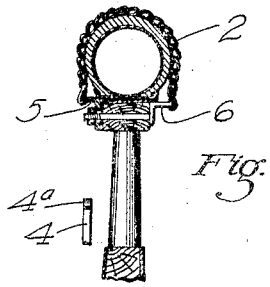

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of a vehicle wheel showing my device in position thereon as applied when not in use: Fig. 2 is a sectional view through 2—2 of Fig. 1: Fig. 3 is a fragmentary side elevational view of the wheel with my device in position as applied when in use: Fig. 4 is a fragmentary side elevational view of the wheel equipped with a modified form of my device shown with a portion in use and a portion in position as applied when not in use and Fig. 5 is a sectional view through 5—5 of Fig. 4.

Similar characters of reference refer to similar parts and portions throughout the several views of the drawing.

The supporting bars 1, chains 2, hooks 3 and chain supporting band 4 constitute the principal parts and portions of my non-skid device in its preferred form.

The supporting bars 1 are each provided with a central hole adapted for the conventional lug clip bolt for securing the rim on the felly and there is one placed under the head of each bolt, resting against the felly, another under each of the lug clips against the felly on the other end of the bolt and each of these supports are provided with outwardly extending portions provided with holes in their extended ends. In one of these holes is secured the one end of a short chain 2 of sufficient length to extend around the tire when inflated in a diagonal direction and be secured in the hole in the support on the opposite side of the felly as shown best in Fig. 3 of the drawing. It being preferable to secure said chain 2 by the hooks 3 at its opposite ends, however it is obvious that the chain may be secured by the link directly at one end if desired.

When the non-skid device is not in use the end of the chain is secured in the hole in the opposite end of the support on the same side as shown best in Fig. 1, thus forming loops of said chains and mounted in these loops is the supporting member 4, all shown best in Fig. 1 of the drawings. This supporting member 4 which is only put in place when the chains are in the inoperative position as shown in Fig. 1 and will be placed in the tool box when the chains are passed about the tire is provided with a plurality of short curved portions 4ª in equal spaced relation, adapted to receive the chains and it is supported by means of a spring, thus providing tension on the chains at all times to prevent them rattling or making a noise.

In the modified form of construction shown in Figs. 4 and 5 of the drawings instead of the conventional lug clip there is provided a special clip constructed the same as the conventional clip except that it is provided with a hole adapted to receive the hook 3 on the opposite end of the chain when the non-skid device is in use.

When the chains are not in use the chain extends down and around the member 4, engaging the recess portions 4ᵃ and the other end extends back and connects with the same lug 5 as shown best in Fig. 4 of the drawings. As previously stated, the springs shown in Figs. 1 and 4 tend to contract the rings and place a tension on the chains to hold them tight and prevent rattling.

Though I have shown and described a particular construction combination and arrangement of parts and portions and certain modifications thereof, I do not wish to be limited to this particular construction, combination and arrangement nor to the modifications thereof, but desire to include in the purview of my invention the construction, combination and arrangement of parts and portions as will be hereby described in detail and partly set forth in the appended claims.

It is obvious that with this construction there is provided a non-skid device for vehicle wheels in which a plurality of short chains are used which are in position ready for use at all times. That the same bolts used for securing the rim on the felly are used for supporting the chains so that the felly is not weakened by additional holes for supporting the chains, that the device is so positioned on the wheel that any portion of it may be used and readily applied by simply loosening one end of the chain, placing it over the tire and snapping it in position on the other side, that the means for supporting the chains when not in use provide a structure in which the chains will not rattle or make a noise.

Having thus described my invention, what I claim as new and desire to secure by Letters Patent is:

1. The combination with a vehicle wheel and tire, of anti-skid chains connected with one side of the wheel and extending transversely of the tire and releasably connected with the opposite side of the wheel when in an operative position, the chains extending radially of the wheel toward the hub thereof when in an inoperative position, an expansible ring positioned about the hub of the wheel for engagement by the inner end portions of the chains when extending radially of the wheel in the inoperative position, and resilient means yieldably holding the ring against spreading.

2. The combination with a vehicle wheel and tire of anti-skid chains connected with one side of the wheel and extending transversely of the tire and releasably connected with the opposite side of the wheel when in an operative position, the chains extending radially of the wheel toward the hub thereof when in an inoperative position, and an expansible ring for engagement by the inner end portions of the chains when extending radially of the wheel in the inoperative position.

In testimony whereof, I have hereunto set my hand at San Diego California this 28th day of November 1919.

HARRY S. WILLIAMS.